United States Patent [19]
Zuege

[11] 3,831,704
[45] Aug. 27, 1974

[54] ISOLATED VEHICLE CONTROL MODULE
[75] Inventor: Charles F. Zuege, Milwaukee, Wis.
[73] Assignee: Allis-Chalmers Corporation, Milwaukee, Wis.
[22] Filed: Nov. 20, 1972
[21] Appl. No.: 308,108

[52] U.S. Cl............ 180/89 R, 296/28 C, 296/35 R
[51] Int. Cl............................................ B62d 27/04
[58] Field of Search................ 180/89 R, 90, 89 A; 296/39, 35 R, 28 C; 74/512, 513

[56] References Cited
UNITED STATES PATENTS
| | | | |
|---|---|---|---|
| 1,533,093 | 4/1925 | Booth | 180/90 |
| 2,137,323 | 11/1938 | Wallach | 180/90 |
| 2,223,395 | 12/1940 | Van Buren | 180/90 UX |
| 3,438,672 | 4/1969 | Gipp | 296/35 R |
| 3,656,799 | 4/1972 | Malm et al. | 296/35 R |

*Primary Examiner*—Kenneth H. Betts
*Assistant Examiner*—Jack D. Rubenstein
*Attorney, Agent, or Firm*—Arthur L. Nelson

[57] ABSTRACT

A vehicle having means defining an operator station including a control module supported on a shroud and resiliently mounted on the vehicle chassis and means defining an engine compartment including a fire wall in spaced relation to the shroud to provide a sound and vibration dampener between the engine compartment and the operator station.

10 Claims, 5 Drawing Figures

PATENTED AUG 27 1974

ISOLATED VEHICLE CONTROL MODULE

This invention relates to a vehicle having means defining an operator station resiliently mounted on the vehicle chassis and more particularly to a operator station isolated from the engine compartment by providing a shroud on the forward portion of the operator's station and a fire wall in spaced relation to the shroud on the rear of the engine compartment to provide sound and vibration deadening between the engine compartment and the operator station.

The trend of the modern tractor is toward an increase in size with a higher speed engine developing greater power. With an increase in power output and speed of engines there is inherently a greater noise output with more vibrations transmitted from the chassis to the operator's station. With an increase in noise level and vibration, the conditions producing fatigue are greater than in the conventional models of tractors.

Accordingly, it is desirable to improve the operating conditions for the operator of the vehicle. A means must be provided to overcome the higher noise levels and the greater vibration and shock inherent with the modern tractor. If the structure defining the operator station of the vehicle is isolated from the chassis of the vehicle, a substantial portion of the vibrations transmitted through the chassis is dampened and substantially eliminated before they are transmitted to the operator station. It is understandable that the engine per se creates a considerable amount of noise and vibrations which are transmitted to the operator station. Accordingly, this invention provides a resiliently mounted operator station to dampen vibrations and substantially eliminate noise transmission from the chassis to the operator station. A further provision to dampen vibrations of the engine and reduce the sound level in the operator station is provided by an insulated double wall between the engine compartment and the operator's station.

It is an object of this invention to provide a double wall to isolate the engine compartment from the operator station to reduce the sound level at the operator's station.

It is a further object of this invention to isolate the operator station from the vehicle chassis by resilient means and reduce noise and vibration transmission from the engine compartment to the operator station with a shroud on the forward end of the operator station supported in spaced relation to the fire wall defining a portion of the engine compartment to reduce the noise level at the operator station.

It is a further object of this invention to provide an operator station defined by a platform and a shroud for supporting the control module with means resiliently supporting the platform on the chassis and a fire wall partially defining the engine compartment in spaced relation from the shroud to produce an air cavity to reduce vibration and sound transmission from the engine compartment to the operator station.

The objects of this invention are accomplished by the use of a platform resiliently mounted on the chassis of the vehicle. The platform may be provided with means for connecting a cab to form an integral structure with the platform. The platform provides a means adapted for mounting the seat on the rearward portion of the platform and a control module on the forward portion of the platform for defining the operator station. The control module is supported on the shroud which is integral with the platform and defines a wall on the forward end of the operator station. The engine compartment is immediately forward on the vehicle with its rearward portion defined by the fire wall which is mounted on the vehicle chassis in spaced relation to the shroud to form an air space or an insulation space to dampen vibrations and reduce noise transmission from the engine compartment to the operator station. The shroud provides a means for mounting the control module carrying the control elements normally operated by the operator. Accordingly, the operator is isolated from the engine compartment through an insulating medium to reduce sound and vibration transmission from the engine compartment to the operator station.

Referring to the drawings.

The preferred embodiment of this invention is illustrated in the attached drawings and will be described in the following paragraphs.

Figure 1:
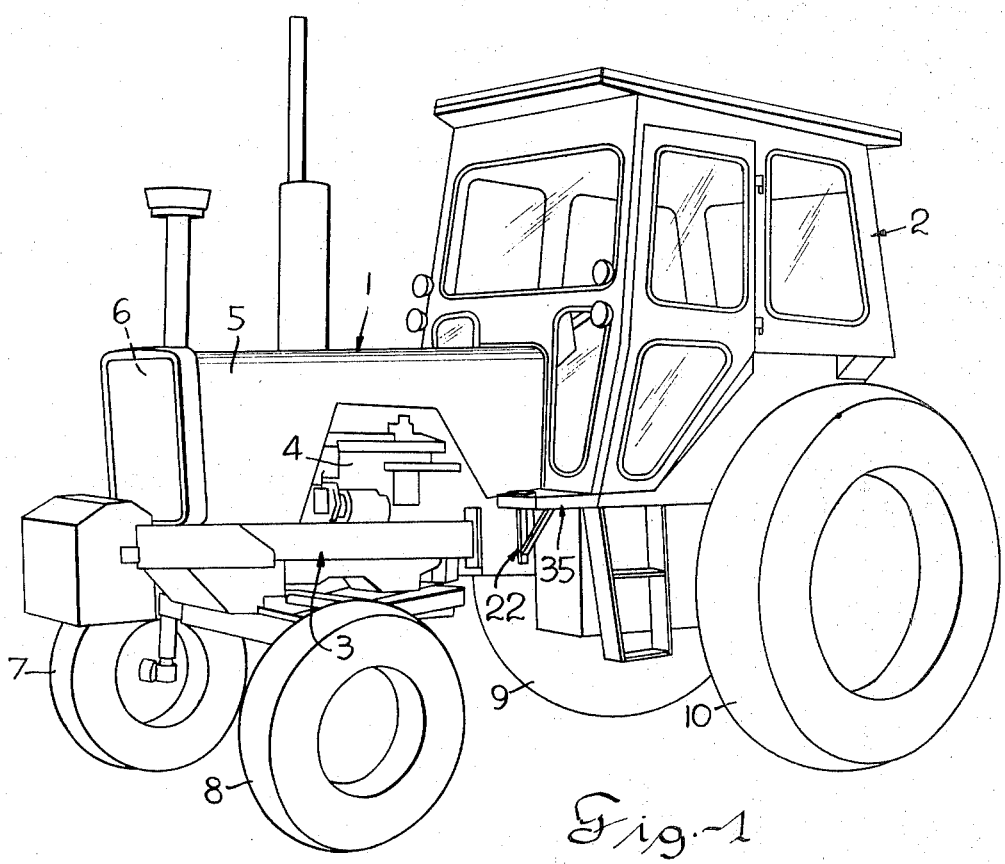
FIG. 1 illustrates a three-dimensional view of a vehicle.

Referring to FIG. 1 the tractor 1 is shown with the cab 2 mounted thereon. The chassis 3 supports the engine 4 and the engine hood 5. The radiator 6 is also supported on the vehicle chassis. A chassis is mounted on the front wheel 7 and 8 and the rear wheels 9 and 10.

Figure 3:
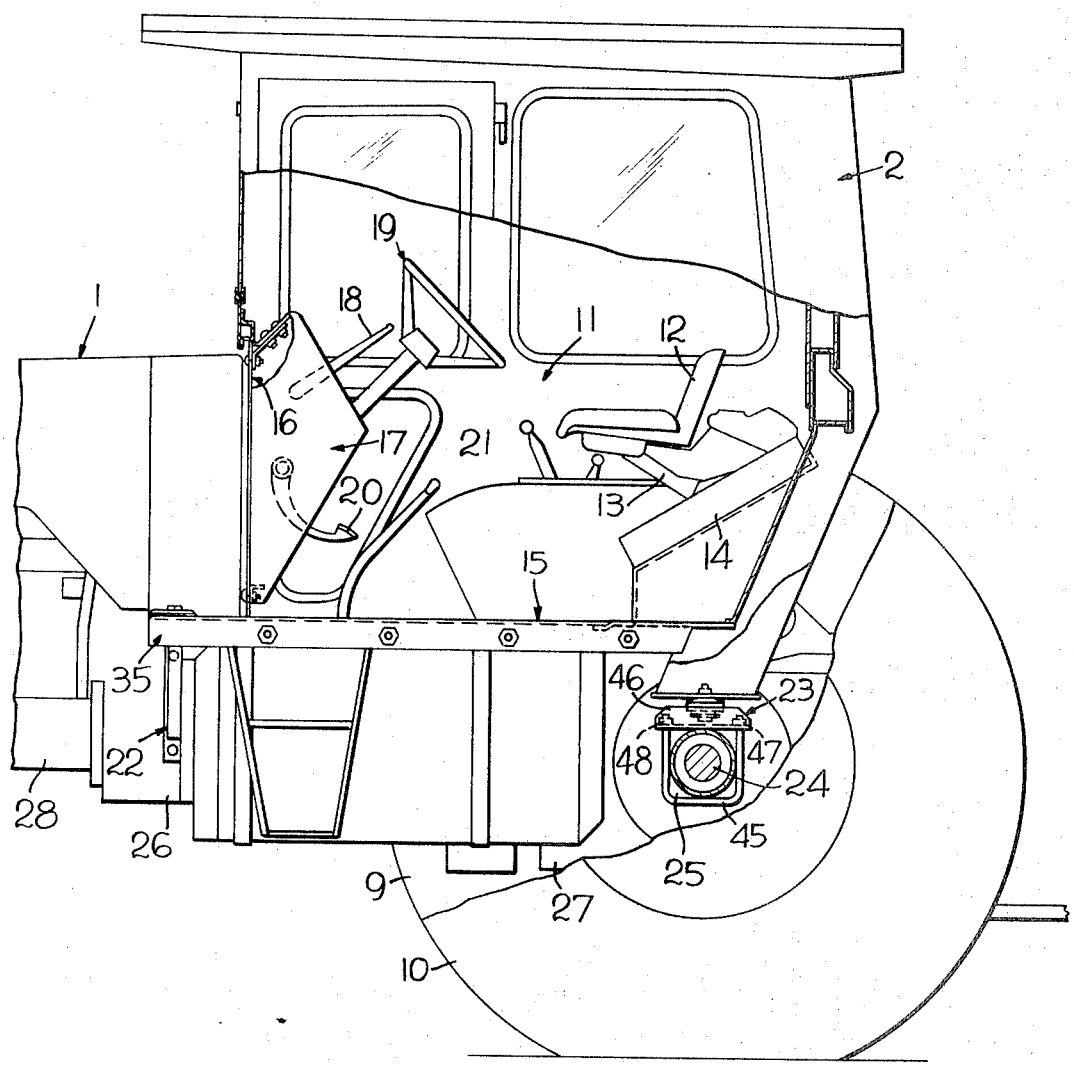
FIG. 3 illustrates a side view of the vehicle with a portion broken away to show the components defining the operator station.

Referring to FIG. 3, the cab 2 is shown mounted on the vehicle platform 15 with a portion of the cab broken away. The operator station 11 inside the cab is defined by the seat 12 mounted on the linkage 13 carried upon the support 14 which is mounted on the platform 15. The platform 15 supports the shroud 16 on a forward end. The shroud 16 provides a support for the control module 17. Control module 17 carries the throttle lever 18, steering mechanism 19 and the clutch and brake pedal 20. An additional control panel 21 is supported on the side of the platform 15 immediately adjacent to the seat 12 to provide additional control means for the operator.

The platform 15 is supported on two front brackets 22 with one on either side of the transmission housing which forms a portion of the chassis 3. The rear end of the platform 15 is also mounted on a pair of rear brackets 23 of which one is shown in FIG. 3. A partial section view shown from the front shows the front bracket 22 in FIG. 2. Similarly, a rear view partially in section shows the rear bracket 23 in FIG. 4. The rear wheels 9 and 10 are shown supporting the rear end of the vehicle in FIG. 3. The rear axle 24 in the rear axle housing 25 is adapted for driving the rear wheel 10. The transmission 26 drives through the rear drive assembly 27 and the rear drive shafts to drive the vehicle.

The frame 28 is connected on the forward end of the transmission to form an integral part of the chassis 3.

The chassis 3 supports the engine on its front end and the platform on its rear end.

Figure 2:
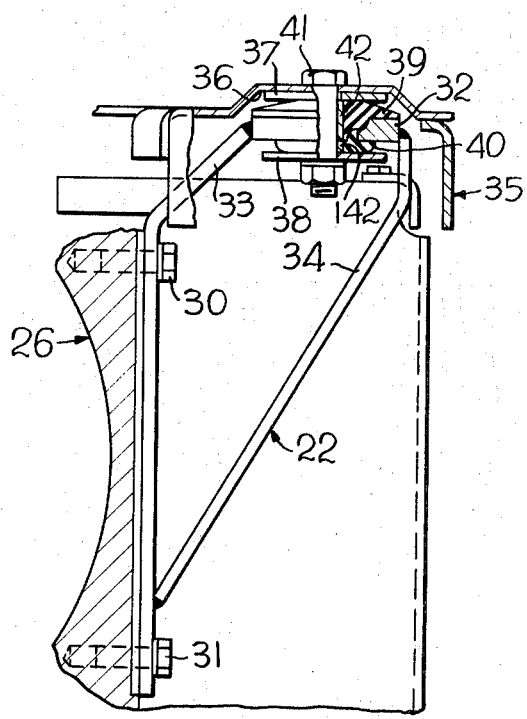
FIG. 2 illustrates a front-section view of the front resilient mount for the platform and cab.

Referring to FIG. 2, the transmission housing 26 is shown in cross-section and the bolts 30 and 31 fasten the bracket 22 to the side of the transmission wall. The bracket 22 includes a plate 32 which is welded to the arms 33 and 34. The platform is formed with the side rail 35 which extends along the side of the platform and has a recess 36 to receive the washer 37. A similar washer 38 is positioned on the underside of the isolators. The resilient insulators include an upper rubber section 39 and a lower rubber section 40 positioned on opposite sides of the disc 32. The bolt 41 extends through the metallic sleeve 42 on the section 39 and also the metallic sleeve 142 of the section 40. As the bolt is tightened the washers 37 and 38 compress the sections 39 and 40 to seat snugly on the upper and lower portion facings of the plate 32. This resiliently supports the rail 35 which supports the platform 15 at its front end. A similar bracket is positioned on the left-hand side of the platform to support the front end of the platform on its opposite side.

Figure 4:
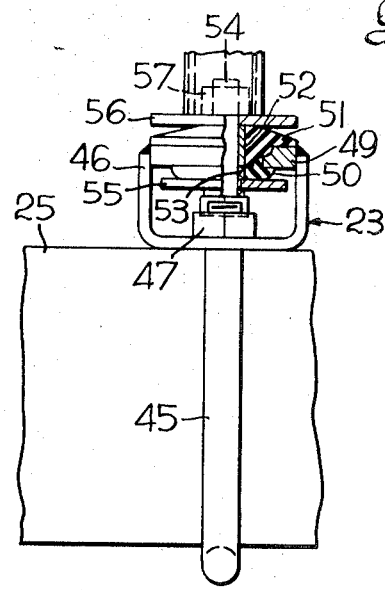
FIG. 4 is a rear view of the resilient mount for the rear end of the cab and platform.

Referring to FIG. 4, a rear axle housing 25 is embraced by the U-bolt 45. The upper ends of the U-bolt 45 engage in channel 46 and they are fastened by the nuts 47 and 48. The channel extends longitudinally on the vehicle and is welded to a plate 49 which is pressed between a pair of rubber sections 50 and 51. The upper section 51 encircles the metallic sleeve 52 while the lower section 50 encircles the sleeve 53. The bolt 54 extends through the sleeve and compresses the washer 55 against the lower section 53 while the washer 56 compresses against the upper section 51 as the nut 57 is tightened. In this manner, the rear end of the platform is resiliently supported.

Figure 5:
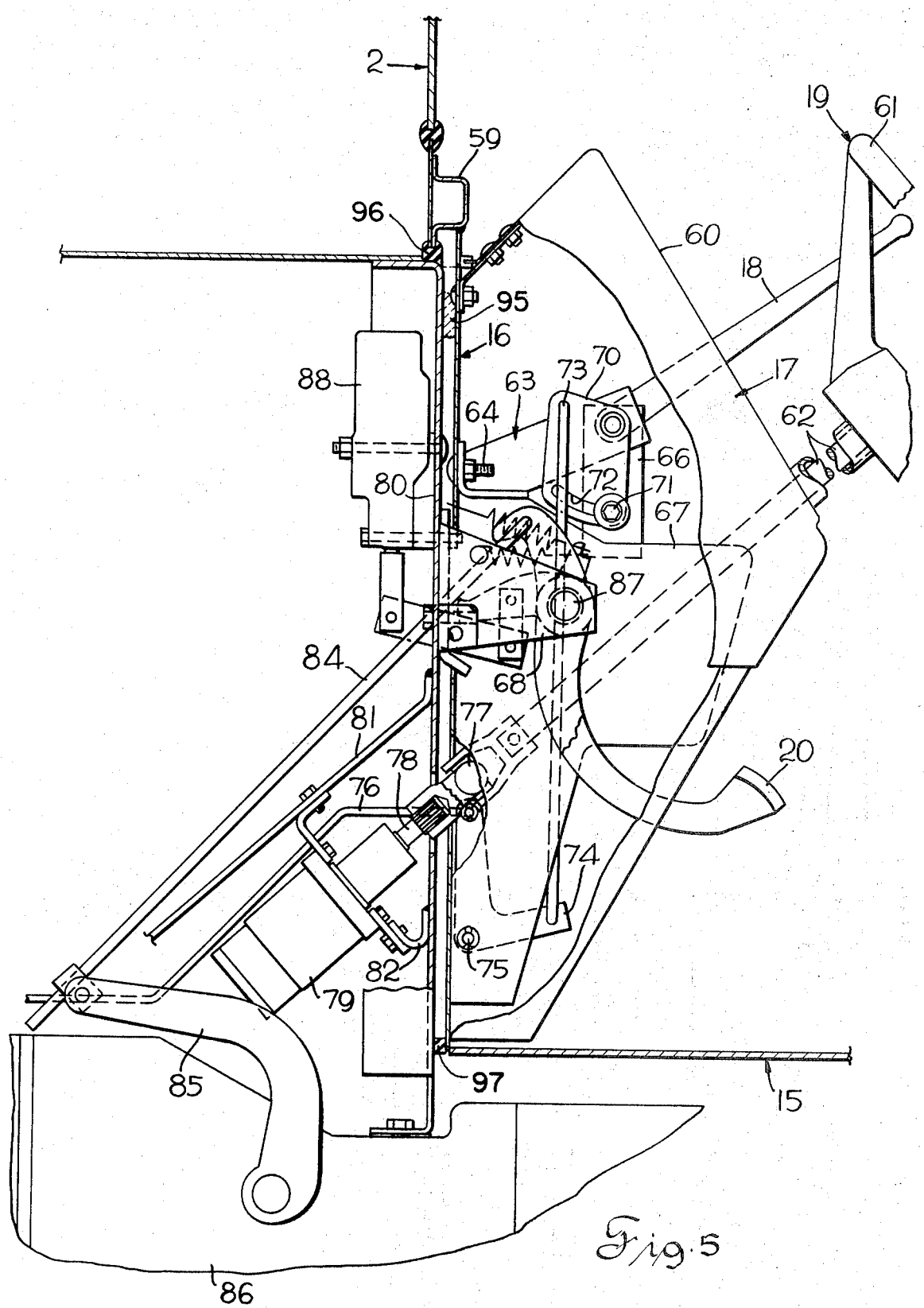
FIG. 5 is a fragmentary cross-section view showing the fire wall and shroud and the related components located on this portion of the vehicle.

Referring to FIG. 5, the platform 15 is shown in section supporting the shroud 16. The shroud 16 extends upwardly and is connected by suitable means to the upper portion 59 of the cab 2. Supported on the shroud 16 is the instrument panel 60 which supports the steering wheel 61 and steering shaft 62. The bracket 63 is fastened by the bolt 64 to the shroud 16. The throttle lever 18 is pivotally mounted on the bracket 63 and the plate 66 which is supported on the mounting 67. The mounting 67 in turn is supported on the shroud 16 and supports the steering shaft 62. The pedal bracket 68 supports the clutch pedal 20. The pedal bracket 68 is also supported on the shroud 16.

The throttle lever 18 is pivotally mounted to pivot the plate 70 in an arcuate manner as the bolt 71 slides through the arcuate slot 72. The link 73 connected to the bell crank 74 rotates the bell crank on a pivoting pin 75 which is supported on bracket 67. The bell crank in turn operates the link 76 which extends to operate the throttle mechanism on the engine 4.

The steering mechanism includes the steering wheel 61 and the steering shaft 62 which extend downwardly to operate through the universal joint 77 which is connected to the shaft 78. The shaft 78 operates the power steering motor 79 which is supported on the fire wall 80 by means of the supporting brackets 81 and 82. Suitable hydraulic connections are provided to connect to the power steering motor on the vehicle to operate the steering mechanism.

The clutch pedal 20 operates through a rod 84 which connects through the arm 85 on the clutch housing 86. The brake pedal 20 is pivotally supported on the pin 87 and operates a linkage to pressurize fluid in the hydraulic master cylinder 88 to operate the vehicle brakes.

The vehicle as described shows the vehicle cab mounted integral with the platform which is resiliently mounted on the chassis. Although sound deadening is a more serious problem for the operator while operating within a cab, this invention also provides a means whereby the double wall arrangement is provided with the control module 17 which is an integral part of the platform when the cab is not used.

The platform 15 is mounted on a pair of brackets 22 on opposite sides of the vehicle chassis which support the front of the platform through resilient means. Likewise, the rear end of the platform is also supported on a pair of brackets 23 which through resilient means support the rear of the platform. The platform supports the cab 2 which defines the operator station together with the seat and control module positioned immediately in front of the seat. The resilient mounting of the platform reduce the shock, vibration and noise transmitted from the chassis which includes the drive train between the engine and the rear wheels.

The engine produces noise and vibration which are transmitted to the chassis and also transmitted directly to the operator station in a conventional vehicle. This invention provides for a fire wall 80 defining the rear portion of the engine compartment. Positioned immediately behind the fire wall is the shroud 16 which essentially is the forward wall of the cab and is connected to the platform for supporting the control module. Sealing strip 96 is shown positioned between the upper edge of the fire wall 80 and the shroud 16 while sealing strip 97 is positioned between the lower edge of the shroud 16 and the fire wall 80. An air space is provided between the fire wall and the shroud which in itself is a dampening medium to reduce transmission of sound and vibrations from the engine compartment to the operator station. A more sophisticated version of this invention is to provide a deadening material such as fiberglass matting or any such sound dampening material 95 which reduces transmission of sound through this double wall arrangement. Accordingly, it can be seen that this invention provides an improved environmental surrounding for the operator and reduces the factors causing fatigue and improves working conditions for the operator.

The embodiments of the invention in which an exclusive property or privilege is claimed are defined as follows:

1. A tractor comprising, a chassis, means defining an isolated operator station including, a platform, resilient mounts resiliently mounting said platform on said chassis, a shroud mounted on the forward portion of said platform, a control module mounted on said shroud including controls for operating said vehicle, means defining an engine compartment including a fire wall mounted on said chassis immediately in front of and in spaced relation to said shroud, said shroud and said fire wall defining a sound and vibration dampening space between said engine compartment and said operator station, resilient means engaging said shroud and said fire wall around said sound and vibration dampening space for reducing transmission of vibrations and sound to said operator station.

2. A tractor as set forth in claim 1 including an engine hood connected to said fire wall partially defining the engine compartment.

3. A tractor as set forth in claim 1 including at least one hydraulic actuator means mounted on said fire wall, flexible operating means connected to said actuator means for control of said vehicle.

4. A tractor as set forth in claim 1 including a steering wheel and shaft mounted on said shroud, a motor means including a hydraulic valve for controlling a hydraulic steering motor, a flexible joint connected between said steering shaft and said hydraulic valve.

5. A tractor as set forth in claim 1 wherein said resilient means defines a sealing means positioned exteriorly of said space between said shroud and said fire wall.

6. A tractor as set forth in claim 1 wherein said resilient means engaging said fire wall and said shroud defines a closed air space for dampening transmission of sound and vibration from said fire wall to said operator's compartment.

7. A tractor as set forth in claim 1 including a sound dampening material positioned between said fire wall and said shroud for deadening transmission of sound and vibration from said engine compartment to said operator's station.

8. A tractor as set forth in claim 1 including rubber insulators positioned between said chassis and said platform to resiliently mount said platform on said chassis.

9. A tractor as set forth in claim 1 including a cab mounted on said platform defining said operator station.

10. A tractor as set forth in claim 1 including a cab wherein the forward wall of said cab defines said shroud.

* * * * *